United States Patent [19]

Kishikawa et al.

[11] 3,853,808

[45] Dec. 10, 1974

[54] REINFORCED POLYPROPYLENE COMPOSITION

[75] Inventors: Hiroshi Kishikawa; Hiroshi Katsuki; Takayuki Terazawa, all of Osaka, Japan

[73] Assignee: Sumitomo Chemical Company, Limited, Osaka, Japan

[22] Filed: Apr. 20, 1972

[21] Appl. No.: 246,020

[30] Foreign Application Priority Data
Apr. 21, 1971 Japan.............................. 46-26261

[52] U.S. Cl......... 260/42.18, 260/42.14, 260/42.15, 260/42.39, 260/42.45
[51] Int. Cl. ........................................... C08f 45/10
[58] Field of Search................ 260/41, 42.18, 42.45

[56] References Cited
UNITED STATES PATENTS 3,308,090  3/1967  Falcone et al. ...................... 260/41
3,416,990  12/1968  Robinson .............................. 161/93
3,632,791  1/1972  Rupprecht et al. ............ 260/41 AG

OTHER PUBLICATIONS

Murphy, Reinforced and Filled Thermoplastics, In I and E.C., Vol. 58, No. 5, May 1966, pages 41–49.

*Primary Examiner*—Allan Lieberman
*Assistant Examiner*—J. H. Derrington
*Attorney, Agent, or Firm*—Sughrue, Rothwell, Mion, Zinn & Macpeak

[57]    ABSTRACT

A reinforced polypropylene composition, having improved mechanical strength and heat resistance as well as high rigidity, comprising polypropylene, a bismaleimide, and glass fibers is disclosed.

7 Claims, No Drawings

REINFORCED POLYPROPYLENE COMPOSITION

BACKGROUND OF THE INVENTION

1. Field of the Invention

The present invention relates to a reinforced polypropylene composition and more particularly, it relates to a crystalline polypropylene composition containing a bismaleimide and glass fibers.

2. Description of the Prior Art

It is known to improve the mechanical strength, rigidity, dimensional stability, and heat resistance of thermo-plastic resins by incorporating glass fibers in the resin and such reinforced thermo-plastic resins have been used widely. Of the various thermo-plastic resins, crystalline polypropylene has particularly excellent mechanical strength and heat resistance in comparison with other polymers and attempts to employ crystalline polypropylene reinforced with glass fibers have been made in the field of engineering plastics due to the excellent rigidity and the improved heat resistance.

However, if the adhesive property of glass fibers to the polymer is insufficient, the effect of reinforcement obtained by the incorporation of glass fibers is not satisfactory and, thus, sufficiently high mechanical strength and excellent heat resistance are not obtained. In the past this has been an obstacle to the successful use of glass fiber-reinforced polypropylenes in the aforesaid field. That is, when glass fibers are simply incorporated in crystalline polypropylene in a conventional manner, the effect of the reinforcement of the resin is insufficient for industrial and economical use of such resins although the mechanical strength and the heat resistance may be improved to some extent.

To improve the adhesive property of glass fibers and crystalline polypropylene, a method in which crystalline polypropylene modified by the addition of an alpha- or beta-ethylenically unsaturated acid or the anhydride thereof is used as the binder for the glass fibers and the polymer is disclosed in Japanese Patent Publication No. 36,421/70. The aforesaid method may result in remarkably improved mechanical strength and heat resistance in comparison with those obtained using conventional methods but the method has the following two disadvantages.

That is, one disadvantage is that the polypropylene modified by an alpha- or beta-ethylenically unsaturated acid or the anhydride thereof has poor thermal stability and the other disadvantage is that troublesome procedures are required for modifying the polypropylene and with such coating the glass fibers withsuch a modified polymer. As a result, one is reluctant to use such a method.

SUMMARY OF THE INVENTION

As the result of the intense investigations on improving the adhesive property of crystalline polypropylene and glass fibers, it has been discovered that improvement of the adhesive property can be effectively attained by adding an amount of a bismaleimide to polypropylene and mixing the polypropylene containing the bismaleimide with glass fibers in a conventional manner.

DESCRIPTION OF THE INVENTION

Polypropylene compositions reinforced in accordance with this invention have essentially the same mechanical strength and heat resistance as the mechanical strength and heat resistance of the reinforced polypropylene prepared by the method (Hercules method) disclosed in Japanese Patent Publication No. 36,421/70. However, polypropylene compositions reinforced in accordance with this invention have one additional advantage in that the rigidity thereof is markedly higher than that of the reinforced polymer prepared by the Hercules method.

Thus, according to the present invention, a reinforced polypropylene composition comprising polypropylene, a bismaleimide, and glass fibers is provided. Advantages of the present invention are that the invention requires no complicated and expensive operations of radically reacting crystalline polypropylene with an unsaturated acid or the anhydride thereof in a solvent as is required in the aforesaid Hercules method and the reinforced polypropylene composition of the invention can be obtained using typical glass fibers in a conventional manner without the necessity of the use of such specific glass fibers which have been treated in a hot solution of the polypropylene modified by the above-mentioned Hercules method. Thus, by the present invention the production of reinforced polypropylene compositions having excellent mechanical strength and heat resistance as well as high rigidity in a simple step and with a low cost becomes possible, which contributes greatly to the development of this field of the art.

The polypropylene used as a component of the composition of this invention may be substantially crystalline polypropylene containing at least 50 percent by weight of an isotactic portion which is prepared in the presence of a Zeigler-Natta coordination catalyst, and is one having a melt index of 0.1 to 15 at 230°C under a load of 2.16 Kg.

Examples of such crystalline polypropylene include crystalline propylene homopolymers and crystalline propylene-ethylene copolymers. The preferred ethylene content of said copolymers is from about 1 to 10 percent by weight.

The polypropylene used in this invention may contain an conventional heat stabilizer and also, if desired, may contain other additives such as lubricants, pigments, flame retardants, and powdery fillers. Furthermore for improving the fluidity of the polymer, a small amount of an organic peroxide may be also incorporated in the polypropylene of this invention.

Specific examples of the bismaleimide used in this invention include N,N'-4,4'-diphenylmethane bismaleimide, N,N'-m-phenylene bismaleimide, N,N'-4-methyl-m-phenylene bismaleimide, N,N'-4,4'-diphenylethane bismaleimide, N-N'-p-phenylene bismaleimide, N,N'-4,4'-diphenylsulfone bismaleimide, N,N'-2,2'-dithiodiphenylene bismaleimide, N,N'-4,4'-dioxyphenylethane bismaleimide, N,N'-3,3'-dichloro-4,4'-biphenylene bismaleimide, N,N'-o-phenylene bismaleimide, N,N'-hexamethylene bismaleimide, and the like.

The glass fibers used in this invention may be any of the commercially available conventional glass fibers and the form of the glass fibers used may be either roving or chopped strands.

The surface of glass fibers are ordinarily coated with an organo-silane compound and there are no limitations on the kinds of coating compositions on the glass fibers used in the present invention. Also, the glass fibers used in this invention may be treated with a conventional binder for forming bundles of them in accordance with conventional techniques. As such binders, conventional thermo-setting resins such as polyvinyl acetates, ethylene-acrylic ester (or salts thereof) copolymers, an aqueous emulsion of epoxy resins, and mixtures of these, are employed.

The amount of the bismaleimide used in the composition of this inventioin can range from about 0.01 to 3 percent by weight, preferably about 0.05 to 1 percent by weight. If the amount of the compound is less than about 0.01 percent by weight, the properties of the polypropylene composition are not improved sufficiently, while if the amount of the compound is larger than about 3 percent by weight, the properties of the composition are not additionally improved and thus the use of an excessive amount of the compound is economically disadvantageous.

The proportion of glass fibers can be varied over a wide range depending upon the purpose of the polypropylene composition prepared but the proportion of glass fibers is preferably less than about 60 percent by weight when the composition of this invention is prepared using chopped strands as the glass fibers because the use of glass fibers in an amount larger than about 60 percent by weight makes mixing of the composition difficult and reduces the appearance of the molded articles. An especially preferred amount of glass fibers in the polypropylene composition ranges from about 10 to 40 percent by weight.

face treating agent: γ-aminopropyltriethoxysilane; binder: polyvinyl acetate), the resultant mixture was extruded using an extruding machine of 50 mm. in diameter of a die temperature of 240°C. to provide pellets of the composition. The pellets thus prepared were molded into test pieces using a five-ounce screw type injection molding machine under the conditions of a resin temperature of 270°C, a mold temperature of 50°C, and screw back pressure of 10kg/cm$^2$ and then the properties of each test piece were measured. The results obtained are shown in Table 1. Furthermore, as a comparative sample, a test sample was prepared using the same procedures as described above employing a polypropylene glass fiber composition containing no N,N' -m-phenylenebismaleimide and the properties were also measured. The results obtained are shown in Table 1.

In these tests the tensile strength of the test samples was measured by the method of ASTM D638-64T, the flexural strength and flexural modulus were by the method of ASTM D790-63, the Charpy impact strength by the method of ASTM D256-56T, and the heat distortion temperature was by the method of ASTM D648-56.

From the results shown in Table 1, it is clear that the reinforced polypropylene composition obtained by the present invention has excellent heat resistance and mechanical strength in comparison with a polypropylene composition prepared in a conventional manner.

Table 1

| Example | Polypropylene (%) | Composition N,N'-m-phenylene-bismaleimide (%) | Glass Fibers (%) | Tensile Strength (kg/cm$^2$) | Flexural Strength (kg/cm$^2$) | Flexural Modulus Rigidity (kg/cm$^2$) | Charpy Impact Strength (kg-cm/cm$^2$) | Heat Distortion Temperature (°C) |
|---|---|---|---|---|---|---|---|---|
| 1 | 69.9 | 0.1 | 30 | 709 | 805 | 45,600 | 6.9 | 149 |
| 2 | 69.5 | 0.5 | 30 | 880 | 928 | 46,900 | 7.4 | 150 |
| 3 | 69.0 | 1.0 | 30 | 928 | 1,083 | 47,200 | 8.5 | 152 |
| Comparative Example | 70 | — | 30 | 487 | 540 | 39,500 | 5.1 | 106 |

The polypropylene composition of this invention can be applied to the production of various molded articles in addition to injection molded articles, such as sheets prepared by extrusion molding or press molding, such as various articles prepared by vacuum forming, and such as laminates of glass fiber cloths and crystalline polypropylene.

Now, the invention will be illustrated in greater detail by reference to the following examples, in which all percentages given are by weight unless otherwise indicated.

EXAMPLES 1 – 3

A powder of a stereo-specific polypropylene having an intrinsic viscosity [η] of 1.8 when measured in tetralin at 135°C was mixed with 0.1 percent, 0.5 percent, or 1.0 percent N,N'-m-phenylene bismaleimide and after mixing the mixture with 30 percent chopped strands composed of glass fibers of 6mm. in length (sur-

EXAMPLE 4

When the same procedure as described in Example 2 was followed except that N,N'-4-methyl-m-phenylenebismaleimide, was used in place of the N,N'-m-phenylenebismaleimide, the polypropylene composition thus prepared had a tensile strength of 695 kg./cm$^2$, a flexural strength of 934 kg./cm$^2$, a flexural modulus of 46,100 kg./cm$^2$, a Charpy impact strength of 7.8 kg-cm/cm$^2$, and a heat distortion temperature of 151°C.

EXAMPLES 5 – 7

The same procedures as described in Example 2 were followed except that the chopped strands bundled using an ethylene-methylacrylate copolymer, an epoxy resin, or a mixture of a polyvinyl acetate and an epoxy resin (1:1 in mixing ratio) in place of polyvinyl acetate were used. The results obtained are shown in Table 2.

Table 2

| Example No. | Binder | Tensile Strength (kg/cm$^2$) | Flexural Strength (kg/cm$^2$) | Flexural Modulus Rigidity (kg/cm$^2$) | Charpy Impact Strength (kg-cm/cm$^2$) | Heat Distortion Temperature (°C) |
|---|---|---|---|---|---|---|
| 5 | Ethylene-Methyl Acrylate Copolymer | 892 | 986 | 47,600 | 7.5 | 150 |
| 6 | Epoxy Resin | 913 | 1,027 | 49,100 | 8.5 | 152 |
| 7 | Mixture of Polyvinyl Acetate and Epoxy Resin | 886 | 934 | 48,900 | 7.9 | 148 |

EXAMPLE 8

When the same procedure as described in Example 2 was followed except that a mixture of 59.9 percent polypropylene powder and 10 percent talc was used in place of the polypropylene powder, the test piece of the polypropylene composition obtained had a tensile strength of 901 kg./cm$^2$, a flexural strength of 1,002 kg./cm$^2$, a flexural modulus of 57,100 kg./cm$^2$, a Charpy impact strength of 7.1 kg-cm/cm$^2$, and a heat distortion temperature of 154°C.

The above results show that when the present invention was applied to the case where a powdery filler was used together with the polypropylene powder, the properties of the product obtained were remarkably improved.

While the invention has been described in detail in terms of specific embodiments thereof, it will be apparent that variations and modifications can be made therein without departing from the spirit and scope thereof.

What is claimed is:

1. A peroxide free-reinforced polypropylene composition comprising polypropylene, glass fibers and a bismaleimide, the proportion of the said glass fibers ranging from about 10 to 40 percent by weight of said composition and the proportion of said bismaleimide ranging from about 0.01 to 3 percent by weight of said composition.

2. The reinforced polypropylene composition as claimed in claim 1, wherein said polypropylene is selected from the group consisting of a crystalline propylene homopolymer and a crystalline propylene-ethylene copolymer.

3. The reinforced polypropylene composition as claimed in claim 1, wherein the proportion of said bismaleimide in the composition ranges from about 0.05 to 1 percent by weight of said composition.

4. The reinforced polypropylene composition as claimed in claim 1, wherein said bismaleimide is N,N'-4,4'-diphenylmethane bismaleimide, N,N'-m-phenylene bismaleimide, N,N'-4-methyl-m-phenylene bismaleimide, N,N'-4,4'-diphenylethane bismaleimide, N,N'-p-phenylene bismaleimide, N,N'-4,4'-diphenylsulfone bismaleimide, N,N'-2,2'-dithiodiphenylene bismaleimide, N,N'-4,4'-dioxyphenylethane bismaleimide, N,N'-3,3'-dichloro-4,4'-biphenylene bismaleimide, N,N'-o-phenylene bismaleimide, or N,N'-hexamethylene bismaleimide.

5. A reinforced polypropylene composition consisting essentially of polypropylene, glass fibers and a bismaleimide, the proportion of said glass fibers ranging from about 10 to 40 percent by weight of said composition and the proportion of said bismaleimide ranging from about 0.01 to 3 percent by weight of said composition.

6. The reinforced polypropylene composition as claimed in claim 1, which consists essentially of said components.

7. The reinforced polypropylene composition as claimed in claim 1, wherein said polypropylene is a crystalline propylene homopolymer.

* * * * *